United States Patent [19]

Matsuda

[11] Patent Number: 5,010,974
[45] Date of Patent: Apr. 30, 1991

[54] 4WD VEHICLE WITH DRIVING FORCE DISTRIBUTION CONTROL

[75] Inventor: Toshiro Matsuda, Sagamihara, Japan

[73] Assignee: Nissan Motor Co., Ltd., Yokohama, Japan

[21] Appl. No.: 506,788

[22] Filed: Apr. 10, 1990

[30] Foreign Application Priority Data

Apr. 10, 1989 [JP] Japan .................. 1-89969

[51] Int. Cl.$^5$ ............................................ B60K 17/34
[52] U.S. Cl. .................................. 180/233; 180/247; 180/248; 364/424.1
[58] Field of Search ............... 180/233, 247, 248, 197; 364/424.1

[56] References Cited

U.S. PATENT DOCUMENTS

| 4,754,834 | 7/1988 | Ozaki et al. | 180/233 |
| 4,757,870 | 7/1988 | Torii et al. | 180/233 |
| 4,773,500 | 9/1988 | Naito et al. | 180/233 |
| 4,776,424 | 10/1988 | Naito | 180/233 |
| 4,846,298 | 7/1989 | Natio | 180/233 |
| 4,874,056 | 10/1989 | Naito | 180/233 |
| 4,887,689 | 12/1989 | Naito | 180/233 |
| 4,890,685 | 1/1990 | Naito | 180/233 |

FOREIGN PATENT DOCUMENTS

| 62-12422 | 1/1987 | Japan . |
| 62-265028 | 11/1987 | Japan . |
| 62-265030 | 11/1987 | Japan . |
| 63-203421 | 8/1988 | Japan . |

Primary Examiner—Mitchell J. Hill
Attorney, Agent, or Firm—Foley & Lardner

[57] ABSTRACT

A control system for a 4WD vehicle includes a drive system for directly transmitting a torque to primary drive wheels such as rear wheels, and transmitting a torque to secondary drive wheels such as front wheels through a torque distributing transfer clutch, a group of sensors for determining a front and rear wheel speed difference, an engine condition such as a throttle opening, and a vehicle speed, and a control unit for controlling the engagement force of the transfer clutch. Normally, the control unit employs a first control mode based on the front and rear wheel speed difference. In rapid acceleration to start the vehicle, the control unit replaces the first mode by a second mode in which the clutch engagement force is increased in accordance with the engine condition such as the throttle opening independent of the wheel speed difference, and thereby prevents undesired spin of the primary drive wheels without delay.

13 Claims, 5 Drawing Sheets

4WD VEHICLE WITH DRIVING FORCE DISTRIBUTION CONTROL

BACKGROUND OF THE INVENTION

The present invention relates to a control system for continuously controlling a driving force distribution between front and rear wheels of a four wheel drive vehicle, and more specifically to a driving force distribution control system which can provides a superior control performance during starting of the vehicle.

Japanese Patent Provisional (unexamined, KOKAI) Publication No. 63-203421 shows a conventional example. A driving force distribution control system of this conventional example is designed to increase an engagement force of a transfer clutch to increase a driving force transmitted to the front wheels in accordance with a front and rear wheel speed difference when a drive wheel slip is produced during acceleration or driving on a slippery road.

However, this conventional system has only one control mode in which the controlled variable is a function of the front and rear wheel speed difference, and always relies on this control mode irrespective of vehicle operating conditions. When the accelerator pedal is depressed quickly to start the vehicle speedily, the sudden depression of the accelerator pedal increases the driving force transmitted to the rear drive wheels, and causes wheel spin of the rear wheels. In such a case, the conventional system cannot increase the clutch engagement force of the transfer clutch until the detected front and rear wheel speed difference is actually increased. In rapid starting, this conventional system cannot prevent drive wheel spin sufficiently and cannot provide satisfactory driving performance. The delay of the control action is further increased by delay in detection of the front and rear wheel speed difference, and delay in the response of a hydraulic unit.

Furthermore, the conventional system forces the transfer clutch to undergo continuously an excessively increased driving force in a slippingly engaged state, so that the transfer clutch is subject to severe wear, and seizure of the clutch plates.

SUMMARY OF THE INVENTION

It is therefore an object of the present invention to provide a driving force distribution control system which can provide excellent driving performance especially in rapid acceleration and improve the durability of a torque distributing transfer clutch.

According to the present invention, a driving force distribution control system of a vehicle includes at least a torque distributing means, first, second and third sensor means, and a controller means.

The torque distributing means comprises a primary drive means for transmitting a driving force from an engine of the vehicle to primary drive wheels of the vehicle, and a secondary drive means for transmitting a driving force from the engine to secondary drive wheels of the vehicle through a torque distributing clutch which is capable of varying the driving force transmitted to the secondary drive wheels in response to a control signal. The primary wheels may be rear wheels, and the secondary wheels may be front wheels of the vehicle.

The first sensor means has a function for determining a wheel speed difference between a primary wheel speed of the primary drive wheels and a secondary wheel speed of the secondary drive wheels. The second sensor means has a function for sensing an engine condition which is a condition of an engine system of the vehicle including the engine and its accelerator system. The third sensor means has a function for sensing a vehicle speed of the vehicle.

The controller means is designed to produce the control signal to control a clutch engagement force of the torque distributing clutch by processing signals of the first, second and third sensor means. The controller means comprises a first controlling means for normally controlling the clutch engagement force of the torque distributing clutch in accordance with the wheel speed difference, and a second controlling means for controlling the clutch engagement force in accordance with the engine condition sensed by the second sensor means when the engine system is in a predetermined state for accelerating the vehicle, and at the same time the vehicle speed is lower than a predetermined threshold speed value.

Figure 1:
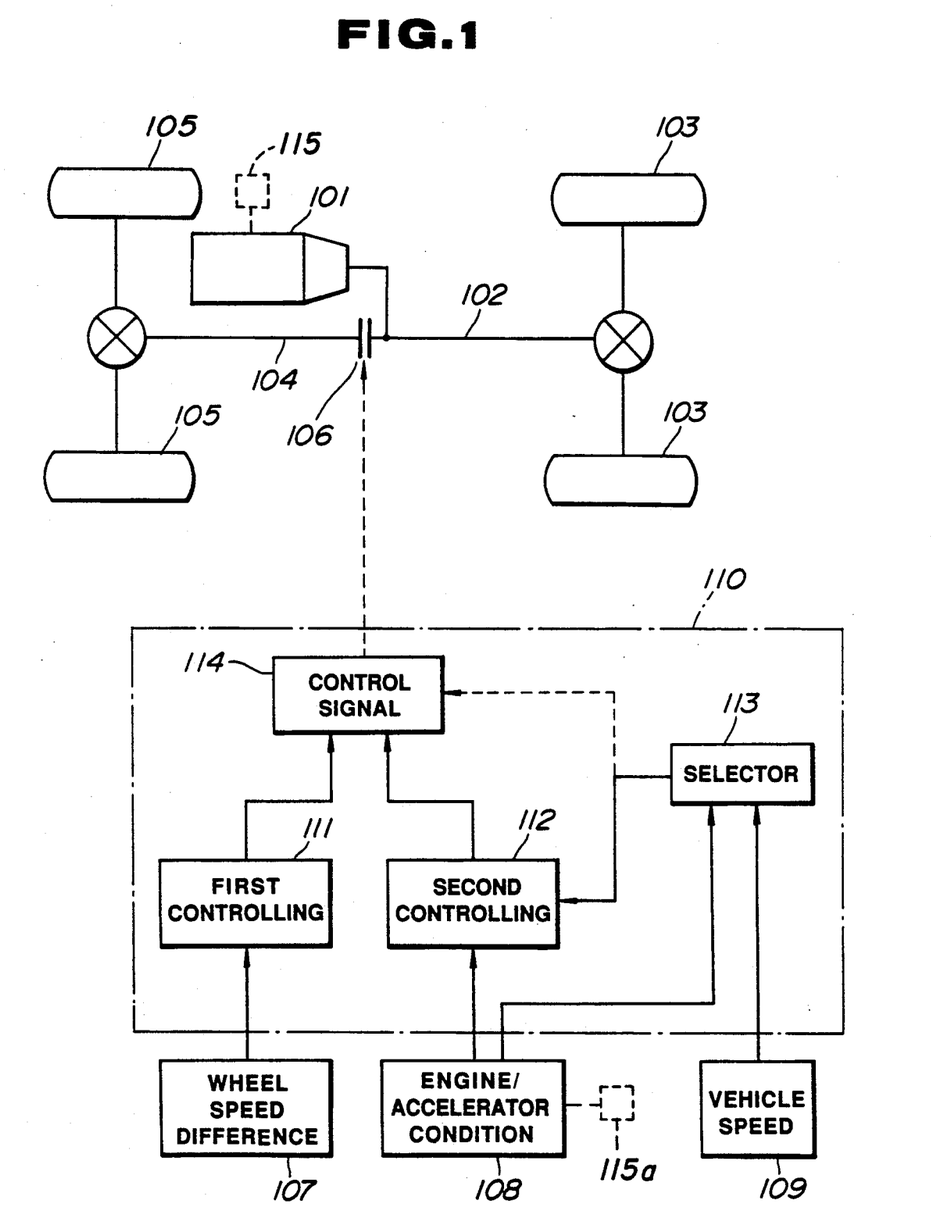
FIG. 1 is a schematic view for showing various means appearing in the claimed invention. The arrangement shown in FIG. 1 is merely one example.

FIG. 1 shows one example of the control system of the invention, to facilitate understanding the invention. In the example shown in FIG. 1, the torque distributing mean includes the primary drive means 102 for transmitting the driving force (or torque) of the engine 101 to the primary drive wheels 103, and the secondary drive means 104 for transmitting the driving force to the secondary drive wheels 105 through the torque distributing clutch 106. The first, second and third sensor means 107, 108 and 109 are connected with the controller means 110 which includes the first controlling means 111 and the second controlling means 112. The controller means 110 of this example further includes a selector means 103 for selectively allowing one of the first and second controlling means to control the clutch engagement force to select one of a first control mode of the first controlling means and a second control mode of the second controlling means. The selector means 113 can be connected in various manners. For example, the selector means 113 may be connected with the second controlling means 112 or the control signal producing means 114, or it may be interposed between the first and second sensor means 107 and 108, and the first and second controlling means 111 and 112. The control signal producing means 114 produces the control signal in accordance with one of the output signals of the first and second controlling means 111 and 112. The second sensor means 108 may be arranged to sense a throttle opening by sensing the position of a predetermined movable element 115a of an accelerator system 115 of the engine 101.

When the accelerator pedal is depressed suddenly to start the vehicle, the second controlling means 112 can immediately increase the clutch engagement force before an increase of the wheel speed difference is detected. Therefore, the control system can prevent spin of the primary drive wheels and improve the durability of the torque distributing clutch.

BRIEF DESCRIPTION OF THE INVENTION

DETAILED DESCRIPTION OF THE INVENTION

An embodiment of the present invention is shown in FIGS. 2-6.

Figure 2:
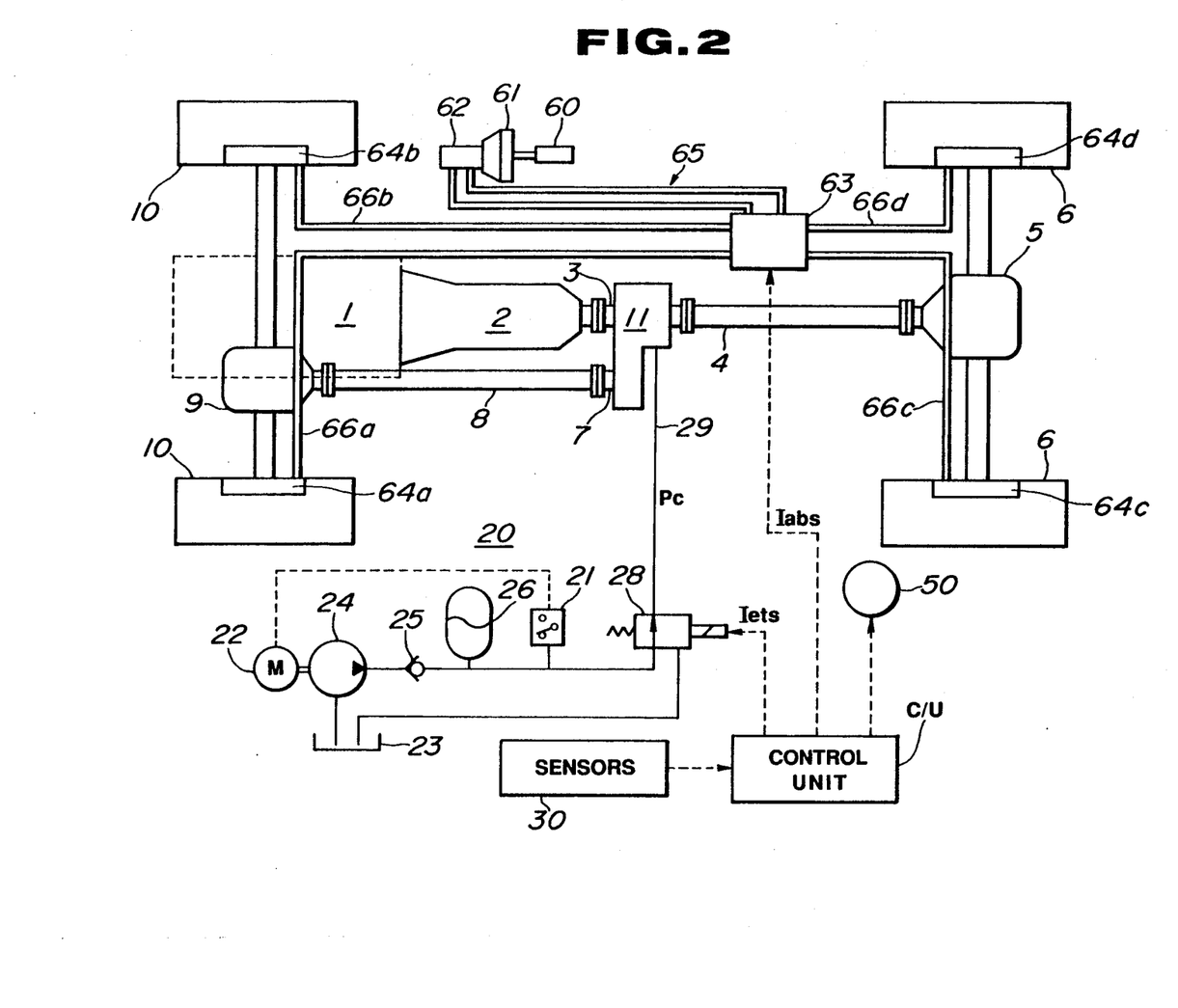
FIG. 2 is a schematic view of a 4WD vehicle equipped with a torque distribution control system of one embodiment of the invention.

FIG. 2 shows a 4WD vehicle equipped with both a torque split control system (driving force distribution control system) and an anti-lock four wheel brake control system (wheel slip brake control system).

The vehicle has a drive system which includes an engine 1, a transmission 2, a transfer input shaft 3, a rear propeller shaft 4, a rear differential 5, rear wheels 6, a transfer output shaft 7, a front propeller shaft 8, a front differential 9, front wheels 10, and a transfer 11. In this embodiment, the rear wheels 6 are primary drive wheels, and the front wheels 10 are secondary drive wheels. From the transmission 2, engine torque is transmitted to the rear wheels 6 through a rear drive line which serves as a primary drive means for transmitting engine torque directly to the primary drive wheels, and transmitted to the front wheels 10 through a front drive line which serves as a secondary drive means having a torque distribution clutch (or a transfer clutch). In this embodiment, the torque distribution clutch is a wet type multiple disc clutch provided in the transfer 11. Therefore, the engine torque is transmitted directly to the rear wheels 6. On the other hand, the engine torque is transmitted to the front wheels 10 through the torque distributing clutch which is capable of continuously varying the torque transmitted to the front wheels, and completely disconnecting the front wheels 10 from the engine 1. The transfer and its torque distributing clutch are illustrated and explained more in detail in commonly assigned U.S. Pat. Nos. 4,754,834; 4,757,870; 4,773,500; 4,776,424; 4,846,298; 4,874,056 and 4,887,689, and commonly assigned U.S. application Ser. Nos. 07/254,875; 07/255,820; 07/277,377 and 07/255,939. The related explanations and figures of these patents are herein incorporated by reference.

The torque split (driving force distribution) control system further includes a hydraulic system 20 for producing a control oil pressure Pc supplied to the distributing clutch, a group of various sensors 30, a control unit C/U, and an alarm indicating device 50. The control unit C/U produces a solenoid drive current signal Iets in accordance with output signals of the sensors 30, and controls the clutch engagement force of the torque distribution clutch of the transfer 11 by sending the solenoid drive signal to a solenoid valve 28 of the hydraulic system 20.

The hydraulic system 20 includes a relief switch 21, a motor 22, an oil reservoir tank 23, an oil pressure pump 24, a check valve 25, an accumulator 26, and the above-mentioned solenoid valve 28. The motor 22 is turned on and off by the relief switch 21, and drives the oil pump 24 which sucks the oil from the reservoir tank 23. The oil pressure discharged from the pump 24 (primary oil pressure) is supplied through the check valve 25, and stored in the accumulator 26. The solenoid valve 28 receives a line pressure (secondary pressure) from the accumulator 26, and produces the control oil pressure Pc in accordance with the solenoid drive current signal Iets sent from the control unit C/U. The control oil pressure Pc is supplied to the torque distributing clutch of the transfer 11 through an oil pipe 29. In this way, the control unit C/U can continuously vary the engagement force of the torque distributing clutch.

Figure 3:
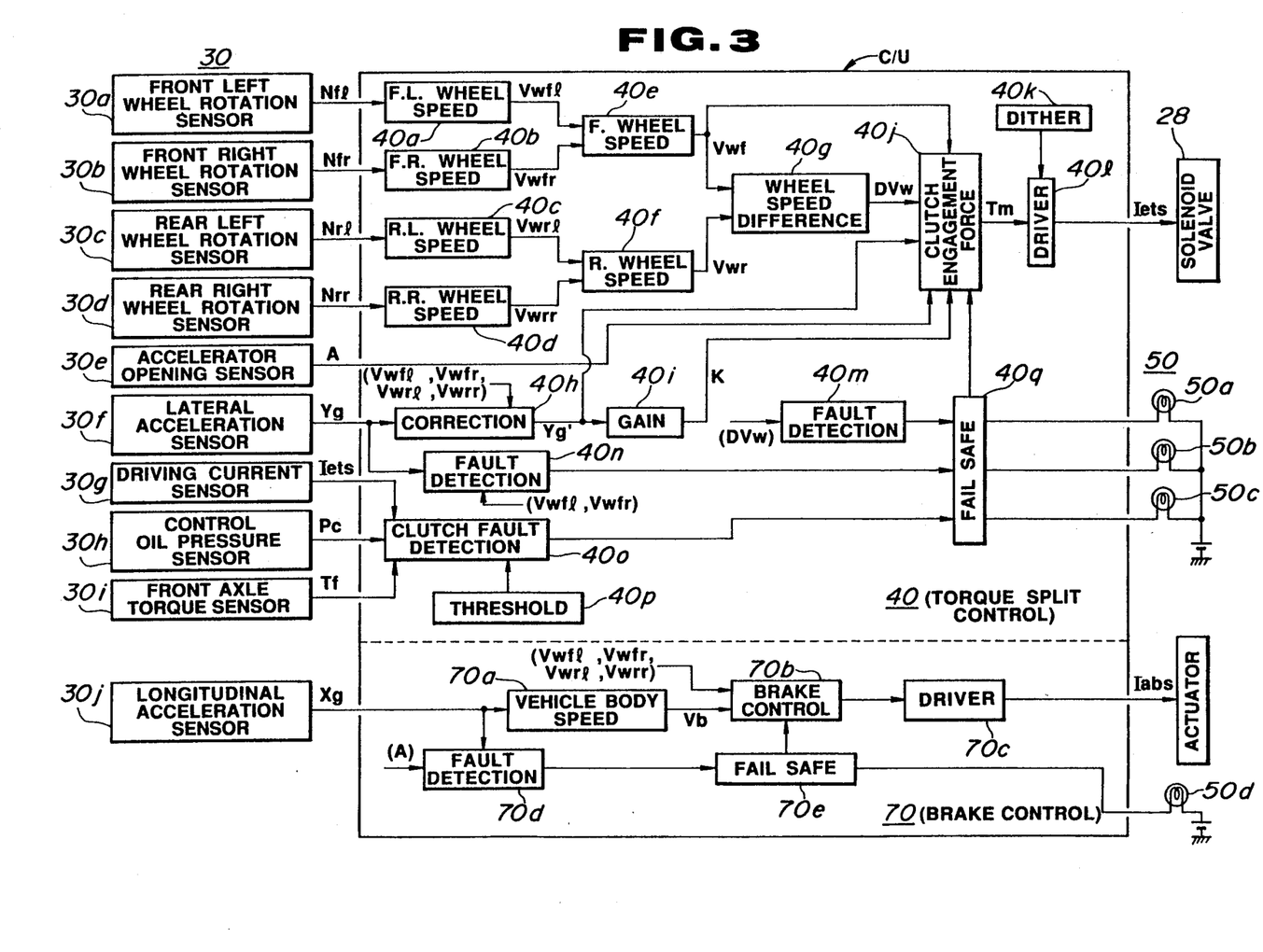
FIG. 3 is a block diagram showing a control unit of the embodiment shown in FIG. 2.

As shown in FIG. 3, the sensor group 30 of this embodiment includes a front left wheel rotation sensor 30a for sensing the number of revolutions Nfl of the front left wheel 10, a front right wheel rotation sensor 30b for sensing the number of revolutions Nfr of the front right wheel 10, a rear left wheel rotation sensor 30c for sensing the number of revolutions Nrl of the rear left wheel 6, a rear right wheel rotation sensor 30d for sensing the number of revolutions Nrr of the rear right wheel 6, an accelerator opening (position) sensor 30e for sensing an accelerator opening A (i.e. an accelerator position or a throttle opening), a lateral acceleration sensor 30f for sensing a lateral acceleration Yg of the vehicle, a drive current sensor 30g, a control oil pressure sensor 30h, a front axle torque sensor 30i and a longitudinal acceleration sensor 30j for sensing a longitudinal acceleration Xg of the vehicle. In this embodiment, the accelerator opening sensor 30e serves as a second sensor means for sensing an engine condition of an engine system which includes the engine and an accelerator system of the engine.

The control unit C/U of this embodiment has a torque split (driving force distribution) control section 40 and an anti-lock brake control section 70, as shown in FIG. 3.

The torque split control section 40 includes a circuit 40a for receiving the signal of the front left wheel rotation sensor 30a and determining a front left wheel speed Vwfl, a circuit 40b for receiving the signal of the front right wheel rotation sensor 30b and determining a front rightwheel speed Vwfr, a circuit 40c for receiving the signal of the rear left wheel rotation sensor 30c and determining a rear left wheel speed Vwrl, and a circuit 40d for receiving the signal of the rear right wheel rotation sensor 30d and determining a rear right wheel speed Vwrr. The torque split control section 40 further includes a circuit 40e connected with the circuits 40a and 40b, for determining a front wheel speed Vwf, a circuit 40f connected with the circuits 40c and 40d, for determining a rear wheel speed Vwr, and a circuit 40g connected with the circuits 40e and 40f, for determining a front and rear wheel speed difference DVw. The front wheel speed Vwf is an average (arithmetic mean) of Vwfl and Vwfr, and the rear wheel speed Vwr is an average (arithmetic mean) of Vwrl and Vwrr. In this embodiment, the front and rear wheel speed difference DVw is a difference obtained by subtracting the front wheel speed Vwf (i.e. a secondary wheel speed) from the rear wheel speed Vwr (i.e. a primary wheel speed). In this embodiment, the wheel rotation sensors 30a-30d, and the circuits 40a-40g serves as a first sensor means for determining a wheel speed difference between a primary wheel speed and a secondary wheel speed.

The torque split control section 40 further includes circuits 40h, 40i and 40j. The circuit 40h is connected with the lateral acceleration sensor 30f, and constructed to determine a true lateral acceleration (corrected lateral acceleration) Yg' by compensating an offset amount inherent in the output signal of the lateral acceleration sensor 30f. The circuit 40i is connected with the circuit 40h, and designed to determine a gain K in accordance with the true lateral acceleration Yg'. The circuit 40j is a circuit for determining a clutch engagement force in accordance with the front and rear wheel speed difference DVw, the gain K and the accelerator opening A. In this embodiment, the lateral acceleration sensor 30f and the circuit 40h serve as a fourth sensor means for determining the lateral acceleration of the vehicle.

The torque split control section 40 further includes a circuit 40k for producing a dither signal, a solenoid driver circuit 40l, a fault detection circuit 40m for detecting faults (abnormal conditions) in the output of the wheel speed difference determining circuit 40g, a fault detection circuit 40n for detecting faults in the lateral acceleration sensor 34f, a fault detection circuit 40o for detecting faults in the torque distribution clutch, a circuit 40p for setting at least one threshold value used as a criterion for the diagnostic judgement of abnormality, and a fail-safe circuit 40q.

The alarm indicating device 50 includes an warning lamp 50a for indicating the occurrence of an abnormal condition in the wheel speed difference signal, a warning lamp 50b for indicating the occurrence of an abnormal condition in the lateral acceleration sensor 30f, and a warning lamp 50c for indicating the occurrence of an abnormal condition in the clutch.

As shown in FIG. 2, the brake system of the vehicle includes a brake pedal 60, a brake booster 61, a master cylinder 62, an actuator 63, wheel cylinders 64a, 64b, 64c and 64d, and brake lines (tubings) 65, 66a, 66b, 66c, and 66d.

The anti-lock brake control system is designed to prevent lock-up of each wheel during braking especially in a panic situation or on a low mu (friction coefficient) road surface by controlling the braking force so as to cause the slip rate (degree of rotational wheel slip) of each wheel obtained from the vehicle body speed and each wheel speed, to approach to the optimum level of about 0.15-0.3. The anti-lock brake control system includes the above-mentioned actuator 63 having a three position selector solenoid valve, and an oil pressure pump motor, and the above-mentioned anti-lock brake control section 70 of the control unit C/U. The anti-lock brake control section 70 produces a brake control signal Iabs to command the actuator 63 to increase, decrease or hold unchanged the brake fluid pressure.

As shown in FIG. 3, the anti-lock brake control section 70 is connected with the longitudinal acceleration sensor 30j, and the individual wheel speed sensors 30a, 30b, 30c and 30d. The brake control section 70 includes a vehicle body speed calculating circuit 70a, an anti-lock brake control circuit 70b, a driver circuit 70c for driving the actuator 63, a fault detection circuit 70d for detecting any faults in the longitudinal acceleration sensor 30j, and a fail-safe circuit 70e. The alarm indicating device 50 further includes a warning lamp 50d for indicating the occurrence of an abnormal condition in the longitudinal acceleration sensor 30j.

Figure 4:
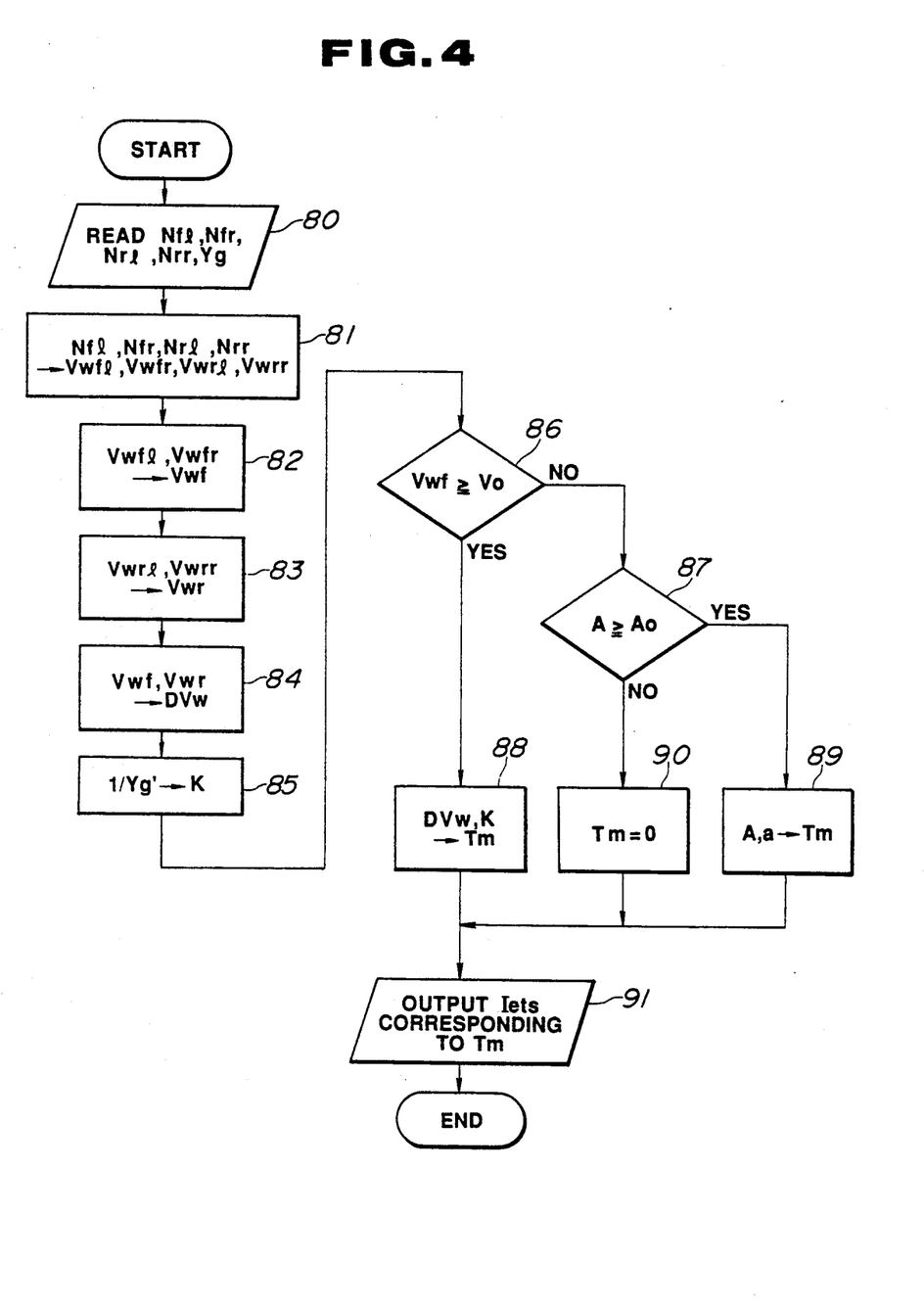
FIG. 4 is a flow chart for showing a control procedure of the embodiment.

The torque split control section 40 of the embodiment controls the driving force distribution according to a control procedure shown in FIG. 4.

At a step 80, the torque split control section 40 reads the sensor signals Nfl, Nfr, Nrl, Nrr, Yg and A of the four wheel speed sensors 30a, 30b, 30c and 30d, the lateral acceleration sensor 30f, and the accelerator opening sensor 30e.

At a step 81, the torque split control section 40 computes the front left wheel speed Vwfl from Nfl, the front right wheel speed Vwfr from Nfr, the rear left wheel speed Vwrl from Nrl, and the rear right wheel speed Vwrr from Nrr.

At steps 82 and 83, the control section 40 computes the front wheel speed Vwf from the front left wheel speed Vwfl and the front right wheel speed Vwfr, and then computes the rear wheel speed Vwr from the rear left wheel speed Vwrl and the rear right wheel speed Vwrr.

At a step 84, the control section 40 computes the front and rear wheel speed difference DVw which is a difference obtained by subtracting the front wheel speed Vwf from the rear wheel speed $(DVw = Vwr - Vwf)$.

At a step 85, the control section 40 determines the gain K which is proportional to the reciprocal of the true lateral acceleration Yg'.

At a step 86, the control section 40 determines whether the front wheel speed Vwf is equal to or higher than a predetermined threshold vehicle speed value Vo. In this embodiment, the control section 40 regards the front wheel speed Vwf as the vehicle speed. Therefore, the front wheel rotation sensors 30a and 30b, and the circuits 40a, 40b and 40e serve as a third sensor means for sensing the vehicle speed. In general, the front wheels 10 are almost free from drive wheel slip, and the front wheel speed is approximately equal to the vehicle body speed. The threshold vehicle speed value is 20 km/h, for example. If the front wheel speed Vwf is lower than the threshold speed value Vo, then the control section 40 proceeds from the step 86 to a step 87. If the front wheel speed Vwf is equal to or higher than the threshold speed value Vo, then the control section 40 proceeds from the step 86 to a step 88. The step 86 corresponds to a first comparing means for determining whether the vehicle speed is equal to or higher than the threshold value Vo.

At the step 88, the control section 40 determines a clutch engagement force Tm from the front and rear wheel speed difference DVw and the gain K. In this embodiment, the control section 40 employs a control characteristic shown in FIG. 6. In the invention, it is possible to employ any of various known control characteristics of the clutch engagement force with respect to the front and rear wheel speed difference. Some examples are disclosed in the above-mentioned patents. The step 88 corresponds to a first controlling means for normally controlling the clutch engagement force of the torque distribution clutch in accordance with the wheel speed difference. The clutch engagement force Tm shown in FIG. 6 corresponds to the magnitude of a first intermediate signal.

At the step 87, the control section 40 determines whether the accelerator opening A is equal to or greater than a predetermined threshold opening value Ao. For example, the threshold opening value Ao is ⅜. If the accelerator opening A is equal to or greater than Ao, then the control section 40 proceeds from the step 87 to a step 89. If the accelerator opening A is smaller than Ao, then the control section 40 proceeds to a step 90. The step 87 corresponds to a second comparing means for determining whether the throttle opening is equal to or greater than the threshold opening value Ao.

Figure 5:
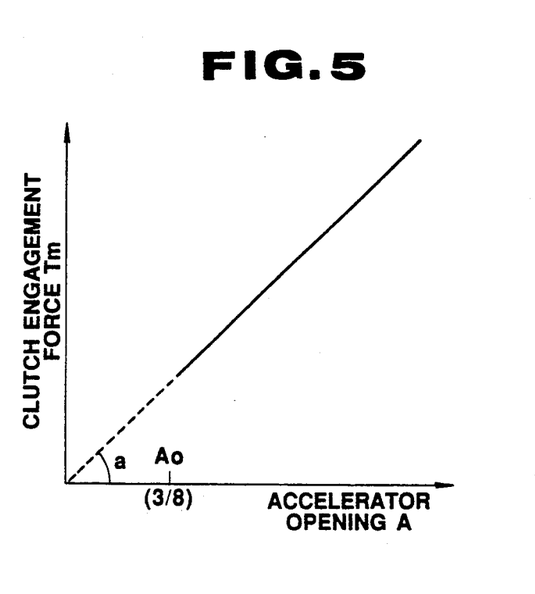
FIG. 5 is a graph showing a relationship between a clutch engagement force Tm and an accelerator opening A, used in the embodiment.
Figure 6:
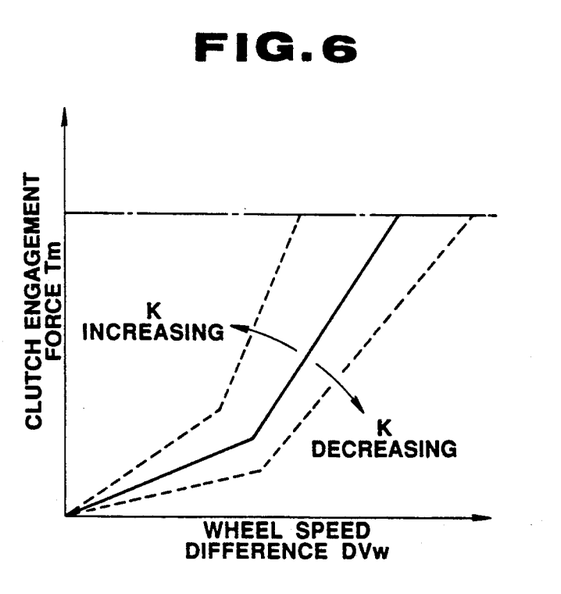
FIG. 6 is a graph showing a control characteristic used as a first control mode in the embodiment of the invention.

At the step 89, the control section 40 determines the clutch engagement force Tm in accordance with the accelerator opening A. In this embodiment, the clutch engagement force Tm determined at the step 89 is proportional to the accelerator opening A, and obtained by multiplying the accelerator opening A by a predetermined coefficient a, as shown in FIG. 5. At the step 90, the control section 40 sets the clutch engagement force Tm equal to zero. The step 89 corresponds to a second controlling means for controlling the clutch engagement force in accordance with the engine condition when the engine system is in a predetermined state for accelerating the vehicle, and at the same time the vehicle speed is lower than the predetermined threshold value Vo. The clutch engagement force Tm shown in FIG. 5 corresponds to the magnitude of a second intermediate signal. The step 90 corresponds to a third controlling means for holding the clutch engagement force equal to zero when the vehicle speed is lower than the threshold value Vo, and at the same time the throttle opening is smaller than the threshold opening value Ao.

At a step 91, the control section 40 delivers the solenoid drive current signal Iets to achieve the clutch engagement force Tm determined at the step 88, or 89 or 90, to the solenoid valve 28. The step of 91 corresponds to a control signal producing means.

The torque split control system of this embodiment is operated as follows:

When the accelerator pedal is depressed hastily to start the vehicle rapidly from rest, then the control section 40 reaches the step 89 through the decision steps 86 and 87. The control section 40 of this embodiment can discriminate a rapid start condition of the vehicle by checking whether the vehicle speed is lower than the predetermined threshold speed value Vo and whether the accelerator opening is equal to or wider than the predetermined threshold opening Ao.

In this case, the control section 40 employs the special control mode of the step 89 based on an engine condition such as the accelerator opening A, instead of the normal control mode of the step 88 based on the wheel speed difference DVw. Therefore, the control section 40 increases the clutch engagement force Tm quickly in accordance with the accelerator opening A before the wheel speed difference DVw is increased. Thus, the control system of the invention can prevent wheel spin during a rapid start, and provide an excellent starting performance. Furthermore, the control system can prevent seizure of the clutch plates, and deterioration of the friction material of the torque distributing clutch. If the torque distributing clutch is held in a slippingly engaged state while the driving force is increased, the clutch plates are subject to heavy wear. The control system of the invention can improve the durability of the torque distributing clutch by avoiding such a severe condition.

When the accelerator pedal is depressed lightly to start the vehicle gradually from rest, the front wheel speed Vwf representing the vehicle speed remains lower than the predetermined threshold vehicle speed value Vo, so that the answer of the decision step 86 is negative. In this case, however, the accelerator opening A remains smaller than the threshold opening value Ao. Therefore, the control section 40 proceeds from the step 87 to the step 90, and puts the drive system in the rear two wheel drive state by holding the clutch engagement force Tm equal to zero. Thus, the control system of the invention prevents the undesired effect of tight corner braking and decreases the understeering tendency in the case of a gradual start of the vehicle. Accordingly, the handling of the vehicle is made easier and suitable for parking and other situations requiring smaller turning radius.

When the vehicle is in normal operating conditions, the vehicle speed becomes equal to or higher than the threshold speed value Vo, and accordingly the control section 40 selects the normal control mode of the step 88 based on the wheel speed difference DVw. Therefore, the control system of the invention ensures the excellent cornering performance inherent in the rear two wheel drive as much as possible, and at the same time improves the driving performance by controlling the driving force distribution so as to prevent drive wheel slip. In this embodiment, the control system decreases the gain K with increase in the lateral acceleration, so that the tight corner braking can be efficiently prevented on a dry paved road having a high friction coefficient, and increases the gain K with decrease in the lateral acceleration, so that the possibility of drive wheel slip can be minimized on a slippery road surface of a low friction coefficient.

The present invention is applicable to a vehicle in which engine power is transmitted directly to the front wheels, and transmitted through the torque distributing clutch to the rear wheels.

In the decision step 87 shown in the flow chart of FIG. 4, the accelerator opening A is employed as an engine condition. However, it is possible to employ a rate of change of the throttle opening or any other operating parameter indicative of accelerating operation. In the step 89, the clutch engagement force is increased in accordance with the throttle opening A. However, it is possible to employ an intake (manifold) pressure, an engine rotational speed, an engine output torque, a drive wheel torque or any other engine operating parameter indicative of the engine driving force, by using an intake pressure sensor, an engine speed sensor, an engine torque sensor, a drive wheel torque sensor or some other appropriate sensor.

What is claimed is:

1. A driving force distribution control system for a vehicle, comprising;
   a torque distributing means comprising a primary drive means for transmitting a driving force from an engine of the vehicle to primary drive wheels of the vehicle, and a secondary drive means for transmitting a driving force from the engine to secondary drive wheels of the vehicle through a torque distributing clutch capable of varying the driving force transmitted to the secondary drive wheels in response to a control signal,
   a first sensor means for determining a wheel speed difference between a primary wheel speed of said primary wheels and a secondary wheel speed of said secondary wheels,
   a second sensor means for sensing an engine condition of an engine system which includes the engine and an accelerator system of the engine,
   a third sensor means for sensing a vehicle speed of the vehicle,
   a controller means for producing said control signal by processing signals of said first, second and third sensor means, said controller means comprising a first controlling means for normally controlling a clutch engagement force of said torque distributing clutch in accordance with said wheel speed difference, and a second controlling means for controlling the clutch engagement force in accordance with said engine condition when the engine system is in a predetermined state for accelerating the vehicle, and at the same time said vehicle speed is lower than a predetermined threshold speed value.

2. A driving force distribution control system according to claim 1 wherein said second sensor means comprises an accelerator sensor responsive to movement of the accelerator system of the engine, for producing an accelerator signal, and said controller means enables said second controlling means to control the clutch engagement force only when said accelerator signal is in a predetermined signal state indicative of a heavy acceleration.

3. A driving force distribution control system according to claim 1 wherein said second sensor means comprises an accelerator sensor for sensing a throttle opening by sensing a position of a predetermined movable element of the accelerator system of the engine, and said controller means enables said second controlling means to control the clutch engagement force only when said throttle opening is equal to or greater than a predetermined threshold opening value.

4. A driving force distribution control system according to claim 3 wherein said controller means further comprises a selector means, connected with said second and third sensor means, for selectively enabling one of said first and second controlling means to control the clutch engagement force.

5. A driving force distribution control system according to claim 4 wherein said selector means comprises a first comparing means for determining whether said vehicle speed is equal to or higher than said threshold speed value, and a second comparing means for determining whether said throttle opening is equal to or greater than said threshold opening value.

6. A driving force distribution control system according to claim 5 wherein said first controlling means includes a means for producing a first intermediate signal whose magnitude increases as said wheel speed difference increases, and said second controlling means includes a means for producing a second intermediate signal whose magnitude increases as said throttle opening increases.

7. A driving force distribution control system according to claim 6 wherein said second controlling means includes a means for increasing the magnitude of said second intermediate signal in proportion to said throttle opening.

8. A driving force distribution control system according to claim 6 wherein said controller means further comprises a control signal producing means for producing said control signal in accordance with one of said first and second intermediate signals.

9. A driving force distribution control system according to claim 7 wherein said controller means further comprises a third controlling means for holding the clutch engagement force equal to zero when said vehicle speed is lower than said threshold speed value, and at the same time said throttle opening is smaller than said threshold opening value.

10. A driving force distribution control system according to claim 9 wherein said primary drive wheels are rear wheels of the vehicle, and said secondary drive wheels are front wheels of the vehicle.

11. A driving force distribution control system according to claim 10 wherein said control system further comprises a fourth sensor means for determining a lateral acceleration of the vehicle, and said first controlling means includes a means for increasing the magnitude of said first intermediate signal in accordance with said wheel speed difference at a rate which is decreased as said lateral acceleration increases.

12. A driving force distribution control system according to claim 5 wherein said second sensor means further comprises an engine sensor for sensing an operating condition of the engine, and producing an engine parameter signal, and said second controlling means includes a means for increasing the clutch engagement force in accordance with said engine parameter signal.

13. A driving force distribution control system according to claim 2 wherein said second sensor means comprises a means for determining a rate of increase of a throttle opening of the engine, and said controller means enables said second controlling means to control the clutch engagement force only when said rate of change of said throttle opening is greater than a predetermined threshold rate value.

* * * * *